(No Model.)
C. H. RUDD.
SAFETY DEVICE FOR ELECTRIC CIRCUITS.
No. 511,461. Patented Dec. 26, 1893.
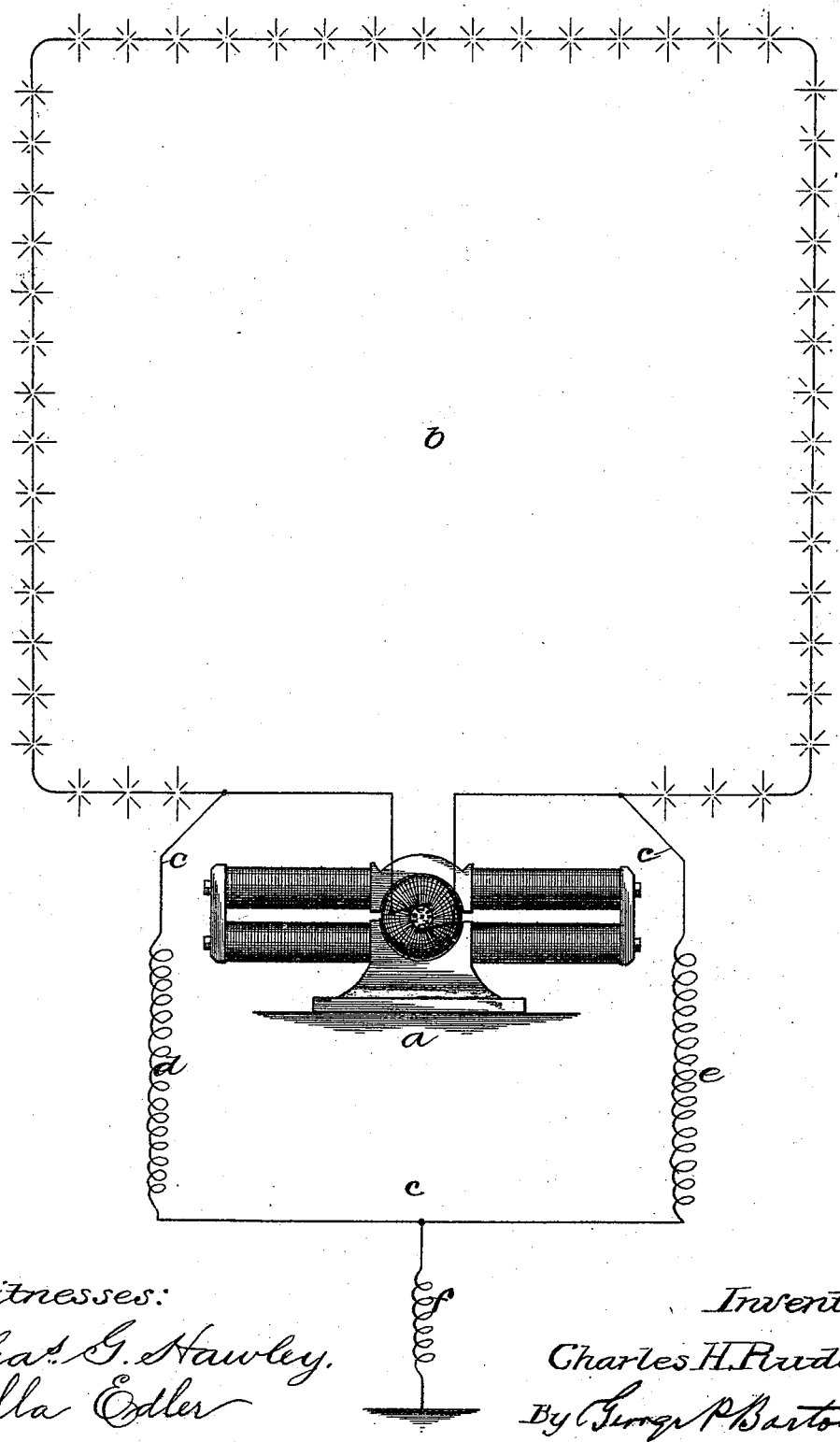
Witnesses:
Chas. G. Hawley.
Ella Edler
Inventor:
Charles H. Rudd.
By George P. Barton
Attorney.

UNITED STATES PATENT OFFICE.

CHARLES H. RUDD, OF EVANSTON, ASSIGNOR TO THE WESTERN ELECTRIC COMPANY, OF CHICAGO, ILLINOIS.

SAFETY DEVICE FOR ELECTRIC CIRCUITS.

SPECIFICATION forming part of Letters Patent No. 511,461, dated December 26, 1893.

Application filed December 10, 1888. Serial No. 293,121. (No model.)

*To all whom it may concern:*

Be it known that I, CHARLES H. RUDD, a citizen of the United States, residing at Evanston, in the county of Cook and State of Illinois, have invented a certain new and useful Improvement in Devices for Relieving Highly-Insulated Circuits of the Static Charge, (Case No. 3,) of which the following is a full, clear, concise, and exact description, reference being had to the accompanying drawing, forming a part of this specification.

My invention relates to electric circuits, for example arc light circuits which are liable to become highly charged with static electricity. These high static charges, when no means are provided for drawing them off, are liable to break away to earth and thus seriously damage the insulation. In some cases the static electricity has been known to flash across the lightning arrester of the dynamo, in which case a persisting arc has sometimes been formed resulting of course, in the extinguishment of all the lamps and burning out of the armature of the machine. As is well known in the art those circuits which are contained in metal pipes are especially liable to become highly charged with static electricity. The causes of the static charge may be various; a cloud, negatively charged, passing over the circuit, might charge the circuit positively; the friction of belts upon machinery near the circuit might charge the machinery to such an extent as to produce a static charge upon the circuit by conduction or otherwise. Whatever may be the cause, it is well recognized that static charges, especially upon electric light circuits are detrimental. The dynamic current and the static charge do not seem to interfere with one another; that is to say, the dynamic electricity and the static charge seem to act the same each as if the other were not present. As before stated it is when the high tension static charge becomes so great as to break away that serious damage may result.

Heretofore apparatus in the nature of lightning arresters have been provided for preventing high static charges from being formed or remaining upon the circuit.

My invention consists in providing a high resistance shunt circuit around the lamps and connecting this shunt circuit to ground after the manner of a Wheatstone bridge or balance, so as to provide at all times a high resistance path to ground for the static electricity. This high resistance path I arrange in such manner that the static charge will be drawn off to ground harmlessly.

My invention is illustrated in the accompanying diagram in which the dynamo $a$ is placed in the lamp circuit $b$ in the usual manner. This circuit $b$, containing the lamps, I have shunted by the high resistance circuit $c$; the sides $d$, $e$, of this shunt circuit may each contain resistance of say one hundred thousand ohms, the connection $f$ to ground between the sides $d$, $e$, may contain also high resistance, say one hundred thousand ohms, which resistance in the wire $f$ it is evident will be offered to current coming from either side of the circuit, as through resistance $d$ or the resistance $e$. The resistance in the circuit $c$ including the resistances $d$ and $e$ is adjusted with reference to the circuit $b$ containing the lamps so that there will be no unnecessary loss of energy. The resistance in the centrally connected ground wire $f$ is adjusted so as to be as high as possible while affording a path to ground. These resistances $d$, $e$, $f$, may be adjusted to suit the voltage of the machine; in case of a machine of twenty five hundred volts I would prefer that the resistance should be as high as stated above. In case of a thousand volt machine, running twenty lamps, the current being ten ampères, the resistance might be much less with safety say fifty thousand ohms or less in each of the sides $d$, $e$ and in the ground branch $f$. The advantage of the shunt circuit $e$ with resistance in its different sides connected with the ground branch $f$ over and above a direct connection to ground through the sum of all the resistances would be great; that is to say, whatever strain there might be upon the circuit $b$ on, for example, the side with which the side $d$ of the shunt circuit is connected, would be relieved by the path afforded through the resistance $e$ on the opposite side of the lamp circuit; thus the strain on opposite sides would reciprocally counteract each other.

An advantage to be derived from placing a corresponding resistance in the ground branch arises from the fact that if at any time the line should become grounded the shunt circuit around the machine would still include two coils of high resistance. Thus, normally, when there is no ground a shunt circuit exists around the machine including the resistances $d$ and $e$, but when a ground is formed a second shunt circuit is created through resistance $f$ and one or the other of the resistances $d$, $e$, according to the location of the ground. In this manner there is practically the same flow of current through the shunt circuits whether the line be grounded or not.

Having thus described my invention, I claim as new and desire to secure by Letters Patent—

The combination with a dynamo electric machine and a working circuit, of a shunt circuit around said working circuit, said shunt circuit containing high ohmic resistance, and a central connection to ground from said shunt circuit containing high ohmic resistance, substantially as described.

In witness whereof I hereunto subscribe my name this 3d day of November, A. D. 1888.

CHARLES H. RUDD.

Witnesses:
CHAS. G. HAWLEY,
GEORGE P. BARTON.